United States Patent
Wortberg

(10) Patent No.: US 11,791,654 B2
(45) Date of Patent: Oct. 17, 2023

(54) BATTERY SYSTEM FOR AN ELECTRIC VEHICLE WITH ELECTRONIC ENERGY SWITCH

(71) Applicant: Lisa Draexlmaier Gmbh, Vilsbiburg (DE)

(72) Inventor: Michael Wortberg, Dorfen (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 0 days.

(21) Appl. No.: 17/581,889

(22) Filed: Jan. 22, 2022

(65) Prior Publication Data
US 2022/0239148 A1    Jul. 28, 2022

(51) Int. Cl.
*H02J 9/06* (2006.01)
*H02J 7/00* (2006.01)
*B60L 1/00* (2006.01)
*B60L 50/60* (2019.01)

(52) U.S. Cl.
CPC ............. *H02J 9/068* (2020.01); *B60L 1/00* (2013.01); *B60L 50/60* (2019.02); *H02J 7/0013* (2013.01); *H02J 7/0042* (2013.01); *H02J 7/0063* (2013.01)

(58) Field of Classification Search
CPC ........ H02J 9/068; H02J 7/0013; H02J 7/0042; H02J 7/0063; B60L 50/60; B60L 1/00
See application file for complete search history.

(56) References Cited

U.S. PATENT DOCUMENTS

2019/0299798 A1* 10/2019 Oyama .................... B60L 50/60
2021/0376627 A1* 12/2021 Sato ......................... H02J 1/001

FOREIGN PATENT DOCUMENTS

| DE | 102016112764 | 1/2016 |
| DE | 102018105626 | 9/2018 |
| DE | 102019204173 | 1/2020 |
| DE | 102019114698 | 2/2020 |

OTHER PUBLICATIONS

DE102016112764 English Language Translation.
DE102018108826A1 English Language Translation.
DE102019204173A1 English Language Translation.
DE 10 2021 101 314.3 German Office Action.
DE102019114699 English Language Translation.

* cited by examiner

*Primary Examiner* — Jared Fureman
*Assistant Examiner* — Duc M Pham
(74) *Attorney, Agent, or Firm* — Jacob Eisenberg

(57) ABSTRACT

A battery system for an electric vehicle is disclosed having a first battery connectable to a first electric drive; a second, redundant battery, connectable to a second, redundant electric drive; and an electronic power switch having a first input terminal, a second input terminal, and an output terminal, the first input terminal being electrically connected to the first battery, the second input terminal being electrically connected to the second battery, and the output terminal being electrically connectable to an electrical accessory, the electronic power switch being configured to selectively and electrically connect the output terminal to the first input terminal or the second input terminal to provide electrical power from the first battery or the second battery to the electrical accessory.

13 Claims, 5 Drawing Sheets

BATTERY SYSTEM FOR AN ELECTRIC VEHICLE WITH ELECTRONIC ENERGY SWITCH

CROSS REFERENCE TO RELATED APPLICATIONS

This application claims priority to German patent application 102021101314.3, filed Jan. 22, 2021, the content of which is herein incorporated by reference.

FIELD OF THE INVENTION

The present invention relates to a redundant battery system for an electric vehicle having an electrical energy switch and a method for redundantly supplying an electrical auxiliary unit of an electric vehicle with electrical energy from a battery system of the electric vehicle for driving the electrical auxiliary unit. In particular, the invention relates to a high-voltage electronic contactor for such a power switch.

BACKGROUND OF THE INVENTION

From the level 3 of automated driving, traction becomes relevant to and for availability and safety. One safety concept is based on dividing the traction battery into two 400V batteries and providing two drive electric motors (front and rear) in a redundancy approach. Two problems arise in this process: 1. when using fuses for the auxiliary unit paths, in the event of a fault, repercussions can occur on the availability-relevant traction on-board network with overcurrent disconnection of the battery due to the inertia of the fuses; and 2. if the auxiliaries are supplied via one of the 400V batteries, this will lead to asymmetrical loading of the batteries. The asymmetrical discharge leads to a limitation of the redundancy concept and therefore of the vehicle range.

It is an object of the present invention to create an improved safety concept for automated driving, and in particular a safety concept that also satisfies levels 3 and 4 in automated driving.

SUMMARY OF THE INVENTION

The present invention is based on the idea of replacing the fuses and contactors for the auxiliary units of the electric vehicle, in particular comfort auxiliary units such as the air-conditioning compressor, with electronic HV (high-voltage) contactors based on HV mosfets or IGBTs. In the event of a fault, these then enable fast, reaction-free shutdown.

Furthermore, the auxiliary units are connected to both batteries (e.g., 400V batteries) with two electronic HV switches, which are wired as energy switches. This energy switch allows (while driving) an uninterrupted switching from one battery to the other. This makes it possible to actively balance the batteries by switching the load.

The two batteries (e.g., realized as 400V batteries) can still be connected in series to a single battery (e.g., 800V battery) for high power charging via bank switching. The possibility of high current charging (e.g., with 400V) at existing columns is inherently also given. The existing modular system of auxiliary units (e.g., 400V auxiliaries) such as steering assistance, air conditioning compressor, heating can still be used.

In contrast to mechanical contacts, which have a large and unpredictable dead time actuation for opening, are therefore for the safety concept required here, not suitable, as the switch-off with the electrical energy switch disclosed here can take place quasi immediately, i.e., without significant dead time. Furthermore, the large number of switching cycles is not feasible for a mechanical contactor. Wear will set in after just a short time, requiring maintenance and thus making autonomous driving inefficient.

In accordance with a first aspect of the invention, the problem is solved by a battery system for an electric vehicle, comprising: a first battery connectable to a first electric drive to provide the first electric drive with electric energy for driving the electric vehicle; a second, redundant battery connected to a second, redundant electric drive connectable to provide electrical power to the second electric drive for driving the electric vehicle; and an electrical power switch having a first input terminal, a second input terminal, and an output terminal, the first input terminal being electrically connected to the first battery, the second input terminal being connected to the second battery, and wherein the output terminal is electrically connectable to an electrical accessory of the electric vehicle to provide the electrical accessory with electrical power for driving the electrical accessory, the electrical power switch being configured to switch the output terminal to be electrically connected to the first input terminal or the second input terminal, as desired, to supply electrical power from the first battery or the second battery to the electrical accessory unit, as appropriate.

This achieves the technical advantage that the electrical energy switch during which an uninterrupted switching from one battery to the other while driving is provided. This makes it possible to actively balance the batteries by load switching. In the event of a fault, these then enable fast, reaction-free disconnection.

According to an exemplary embodiment of the battery system, the battery system is designed according to a redundancy corresponding to safety level C or D of the ASIL (Automotive Safety Integrity Level) standard.

This achieves the technical advantage that with this battery system an improved safety concept for automated driving can be ensured which also satisfies levels 3 and 4 automated driving.

According to an exemplary embodiment of the battery system, the electrical power switch comprises: a first pair of electronic switches connected between the first input terminal and the output terminal; and a second pair of electronic switches connected between the second input terminal and the output terminal.

By realizing the energy switch as an electrical energy switch, i.e. based on electronic components, such as semiconductor switches, fast, reaction-free disconnection can be ensured so that there are no repercussions on other systems in the vehicle in the event of a fault. In the conventional solution, on the other hand, protection against short circuits or overcurrent is provided by a fuse. However, this is very slow-acting and requires a high tripping current. This current can lead to a significant voltage drop of the battery and the line paths, which in turn has repercussions on other functions, some of which are safety-related.

According to an exemplary embodiment of the battery system, the first pair comprises an electronic switch comprising two series-connected bidirectional HV MOSFETs or IGBTs, each blocking in the opposite direction to each other; and the second pair of electronic switches comprises two series-connected bidirectional HV MOSFETs or IGBTs, each blocking in the opposite direction to each other.

The bidirectional design achieves the following advantages: the independence of the two memories inherits the original ASIL level; with bidirectional design, two mosfets (IGBTs) each can block and the ASIL requirement can thus be decomposed. Furthermore, equalization of currents are avoided when both branches are switched through simultaneously.

According to an exemplary embodiment of the battery system, a first electronic switch of the first pair of electronic switches is adapted, in response to a first switching signal, to inhibit current flow in a direction from the first battery to the auxiliary electrical unit; wherein a second electronic switch of the first pair of electronic switches is adapted, in response to a second switching signal, to inhibit current flow in a direction from the first battery to the auxiliary electrical unit. A pair of electronic switches is adapted, in response to a second switching signal, to inhibit current flow in the direction from the auxiliary electric unit to the first battery; wherein a first electronic switch of the second pair of electronic switches is adapted, in response to a third switching signal, to inhibit current flow in the direction from the second battery to the auxiliary electric unit; and wherein a second electronic switch of the second pair of electronic switches is adapted, in response to a third switching signal, to inhibit current flow in the direction from the second battery to the auxiliary electric unit. An electronic switch of the second pair of electronic switches is adapted, in response to a fourth switching signal, to block a current flow in the direction from the auxiliary electric unit to the second battery.

This achieves the advantage that two electronic switches each lock and each two electronic switches can pass. Thus, the ASIL requirement of levels 3 and 4 can be fulfilled. Furthermore, equalizing currents are avoided when both branches are switched through simultaneously.

According to an exemplary embodiment of the battery system, the electrical energy switch further comprises: a second output terminal electrically connectable to a second electrical accessory of the electric vehicle to provide the second electrical accessory with electrical energy for driving the second to supply the electrical auxiliary unit.

This has the advantage that two (and more auxiliary units) can be supplied with electrical energy in accordance with the safety concept presented here.

According to an exemplary embodiment of the battery system, the electrical power switch further comprises: another first pair of electronic switches connected between the first input terminal and the second output terminal; and another second pair of electronic switches connected between the second input terminal and the second output terminal.

Even when several auxiliary units are used, faulty modules are shut down quickly and without feedback.

According to an exemplary embodiment of the battery system, the battery system further comprises: a first high-voltage contactor connected between the first input terminal of the electrical energy switch and a drive-side terminal of the first battery, the first high-voltage contactor being configured to disconnect the first input terminal of the electrical energy switch from the drive-side terminal of the first battery in response to a first shutdown signal; and a second high-voltage contactor connected between the second input terminal of the electrical energy switch and a drive-side terminal of the second battery, the second high-voltage contactor being adapted to disconnect the second input terminal of the electrical energy switch from the drive-side terminal of the second battery in response to a second shutdown signal.

According to an exemplary embodiment of the battery system, the first input terminal of the electrical energy switch is connected to a first drive-side terminal, in particular a drive-side positive terminal, of the first battery and a first drive-side terminal, in particular a drive-side positive terminal, of the second battery.

According to an exemplary embodiment of the battery system, the output terminal of the electrical energy switch can be electrically connected via the electrical auxiliary unit to a second pole of the first battery or the second battery, in particular a negative pole on the drive side or the mains side.

According to an exemplary embodiment of the battery system, the battery system further comprises: a third high-voltage contactor connected between a first line-side terminal of the first battery and a charging receptacle, the third high-voltage contactor being adapted to disconnect the first line-side terminal of the first battery from the charging receptacle in response to a third disconnect signal; and a fourth high-voltage contactor connected between a second line-side terminal of the second battery and the charging receptacle, wherein the fourth high-voltage contactor is adapted to disconnect the second line-side terminal of the second battery from the charging socket in response to a fourth disconnection signal.

According to an exemplary embodiment of the battery system, the battery system further comprises: a fifth high-voltage contactor connected between the first line-side pole of the first battery and a first line-side terminal of the second battery, wherein the fifth high-voltage contactor is configured to disconnect the first line-side terminal of the first battery from the first line-side terminal of the second battery in response to a fifth disconnect signal.

According to an exemplary embodiment of the battery system, the second grid-side terminal of the first battery is electrically connected to the second grid-side terminal of the second battery.

According to an exemplary embodiment of the battery system, the electrical energy switch is designed to switch the electrical auxiliary unit from the first battery to the second battery without interruption.

According to a second aspect, the invention relates to a method for supplying an electrical auxiliary unit of an electric vehicle with electrical energy from a battery system of the electric vehicle for driving the electric auxiliary unit, the battery system comprising: a first battery connectable to a first electric drive (M1) for supplying the first electric drive (M1) with electric energy for driving the electric vehicle, a second, redundant battery (Bat2) connectable to a second, redundant electric drive (M2) to provide electrical power to the second electric drive (M1) for driving the electric vehicle; and a configurable electrical power switch having a first input terminal, a second input terminal, and an output terminal, wherein the first input terminal is electrically connected to the first battery (Bat1), the second input terminal is electrically connected to the second battery (Bat2), and the output terminal is electrically connected to the auxiliary electric power unit of the electric vehicle to supply the auxiliary electric power unit with electric power for driving the auxiliary electric power unit, the method comprising the steps of: configuring the electrical power switch to electrically connect the output terminal to the first input terminal to supply electrical power from the first battery to the electrical accessory; and optionally reconfiguring the electrical power switch to electrically connect the output terminal to the second input terminal to supply electrical power from the second battery to the electrical accessory to supply the auxiliary unit with electrical energy from the second battery.

With such a method, the technical advantage is achieved that the electrical energy switch allows uninterrupted switching from one battery to the other while the vehicle is in motion. This makes it possible to achieve active balancing of the batteries through load switching to be carried out. In the event of a fault, these then enable fast, reaction-free shutdown.

For example, the process can run on a controller, such as a vehicle controller or a battery controller.

According to a third aspect of the invention, the problem is solved by a computer program comprising a program code for carrying out the method according to the second aspect, when the program code runs on a computer or processor.

The computer program can be implemented on a controller, e.g. a vehicle controller or a battery controller.

BRIEF DESCRIPTION OF THE SEVERAL VIEWS OF THE DRAWINGS

Further advantageous features and details of the various embodiments of this disclosure will become apparent from the ensuing description of preferred exemplary embodiments and with the aid of the drawings. The features and combination of features recited below in the description or in the drawings alone, may be used not only in the particular combination recited but also in other combinations on their own, without departing from the scope of the disclosure.

In the following, advantageous examples of the invention are explained with reference to accompanying figures, wherein.

DETAILED DESCRIPTION OF THE INVENTION

Figure 1:
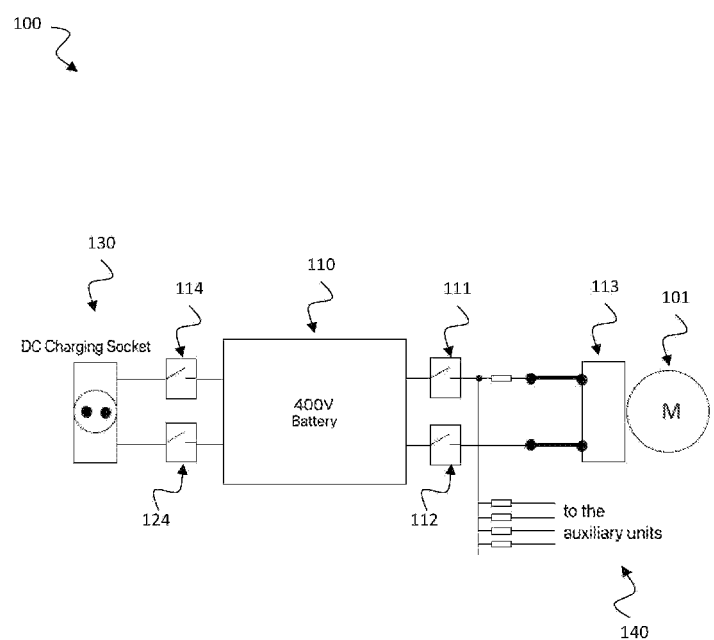
FIG. 1 depicts a schematic representation of a conventional HV traction on-board network in simplified form.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C" should be understood as including only one of A, only one of B, only one of C, or any combination of A, B, and C.

In the following detailed description, reference is made to the accompanying drawings, which form a part hereof and in which, by way of illustration, specific embodiments are shown in which the invention can be carried out. It is understood that other embodiments may also be used, and structural or logical changes may be made without departing from the concept of the present invention. Therefore, the following detailed description is not to be understood in a limiting sense. It is further understood that the features of the various embodiments described herein may be combined with each other, unless otherwise specifically indicated.

Aspects and embodiments are described with reference to the drawings, wherein like reference signs generally refer to like or related elements. In the following description, for purposes of explanation, numerous specific details are set forth to provide an in-depth understanding of one or more aspects of the invention. However, it may be apparent to one skilled in the art that one or more aspects or embodiments may be described with a lesser degree of specific details but can still be carried out. In other cases, known structures and elements are shown in schematic form to facilitate describing one or more aspects or embodiments. It is understood that other embodiments may be used and structural or logical changes may be made without departing from the concept of the present invention.

Fig. shows 1 a schematic diagram of a conventional HV traction on-board network 100 in simplified form.

A battery 110, e.g., 400V battery, is via switch and power 111,112 as well as electronics 113 connectable to a drive motor 101 to drive the electric vehicle. Connections branch off from the positive terminal of the battery 110 to the auxiliary units 140 to supply electrical power from the battery 110 to the auxiliary units 140. Further switches 114,124 can be used to connect 130 the battery to a DC charging socket 110 for charging.

This configuration is not suitable for autonomous driving because no redundancy is available. In particular, an ASIL C or D safety level on the availability of the traction is not possible, since many single point faults can potentially lead to a failure of the traction.

The Automotive Safety Integrity Level (ASIL) is a risk classification scheme defined in the standard ISO 26262— Functional Safety for Road Vehicles. This is an adaptation of the Safety Integrity Level (SIL) used in IEC 61508 for the automotive industry. This classification helps to define the safety requirements necessary to comply with the ISO 26262 standard. The ASIL is established through a risk analysis of a potential hazard, taking into account the severity, exposure and controllability of the vehicle operating scenario. The safety objective for this hazard in turn carries the ASIL requirements.

There are four ASILs identified by the standard: ASIL A, ASIL B, ASIL C, ASIL D. ASIL D prescribes the highest integrity requirements for the product and ASIL A the lowest.

Figure 2:
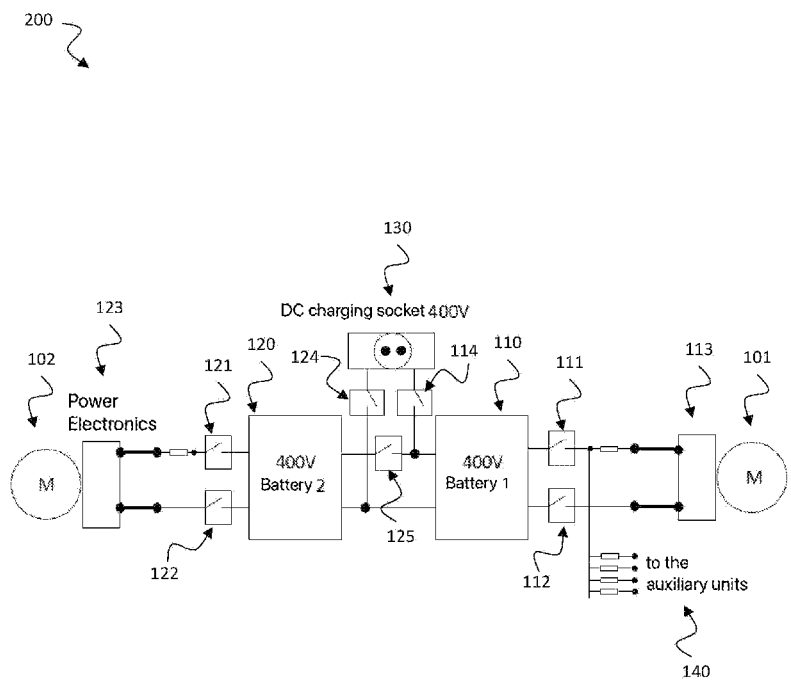
FIG. 2 depicts a schematic representation of the implementation of a safety concept in autonomous driving with redundancy of the sources and the drive.

FIG. 2 shows a schematic diagram of the implementation of a safety concept in autonomous driving with redundancy of the sources and the drive. Two drive motors 101,102 and two batteries 110,120 are provided in this on-board power supply or battery system in order to implement the safety concept with redundant sources 110,120 and drives 101,102.

The first battery 110, implemented for example as a 400V battery, is connectable to the first drive motor 101 via switches 111, 112 and power electronics 113 to drive the electric vehicle. Connections branch 110 from the positive terminal of the first battery to the auxiliary units 140 are provided to supply the auxiliary units 140 with electrical energy from the first battery 110. Further switches 114, 124, 125 can be used to connect the first battery 110 to a DC charging socket 130 for charging.

The second battery 120, e.g., realized as 400V battery, is provided as redundant battery. The second battery 120 is connectable to the second drive motor 102 via switches 121, 122 and power electronics 123 to drive the electric vehicle.

The switches 124,125,114 can be used to connect the second battery 120 to the DC charging socket 130 for charging.

An auxiliary unit 140 can be, for example, the compressor for air conditioning the batteries. This is not relevant to safety for a short-term transition to the safe state (thermal inertia of the battery). However, for the function it would be useful to maintain the supply of this aggregate, even if a battery has to be shut down or relieved. Furthermore, in this arrangement the ancillary units 140 load a battery (asymmetrical load). For the above reasons, it is desirable to be able to switch the supply of the auxiliary units 140 between the sources, i.e. the batteries 101,102. Such a solution is presented in FIG. 3.

According to the state of the art, solutions with two batteries for a redundant traction supply are known with two compressors each for the first and the second battery. The dual design of the compressor is necessary here because it is not possible to switch from one battery to the other.

Figure 3:
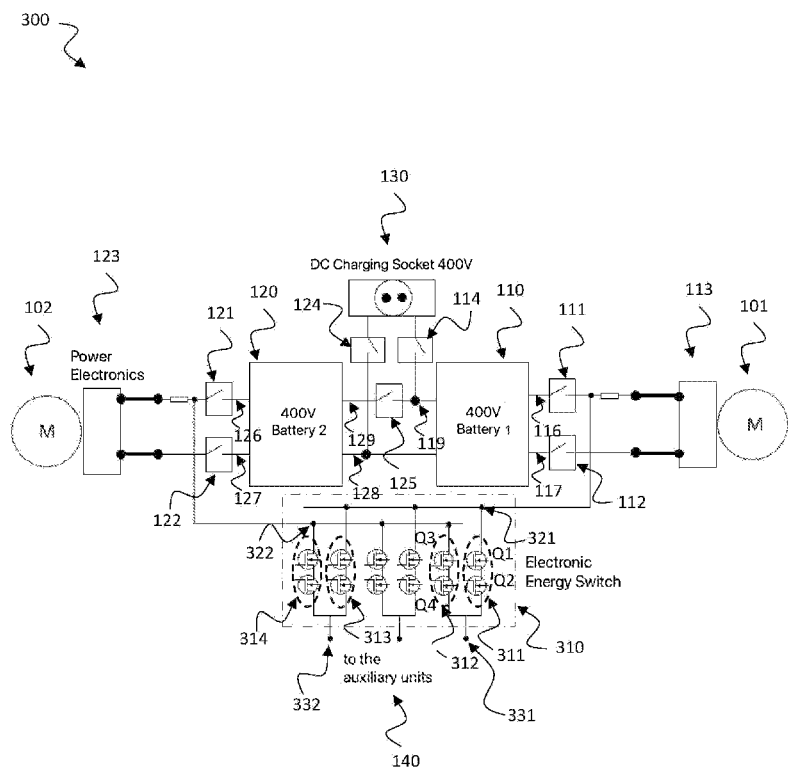
FIG. 3 depicts a schematic representation of the configuration according to the invention with HV energy switch.

FIG. 3 shows a schematic diagram of the configuration according to the invention with 300 HV energy switch 310. Here, the energy switch can consist of a pair of bidirectional HV Mosfets or IGBTs.

The battery system 300 for an electric vehicle as shown in FIG. 3, comprises: a first battery 110 connectable to a first electric drive 101 to provide electrical energy to the first electric drive to power the electric vehicle; a second, redundant battery 120 connectable to a second, redundant electric drive to provide electrical energy to the second electric drive to power the electric vehicle; and a second, redundant battery 120 connectable to a second, redundant electric drive 102 to provide electrical energy to the second electric drive to provide electrical power to drive the electric vehicle; and an electrical power switch 310.

An energy switch in the context of the present disclosure is a switch that can transfer energy via two different paths in a manner analogous to a mechanical switch. The energy can come from a first source or battery or from a second source or battery. The energy switch can switch the source path via which a consumer, e.g., an auxiliary unit, draws its electrical energy. An electrical energy switch can switch the paths by means of electronic switches, e.g., Mosfets or IGBTs.

A Mosfet is a metal-oxide-semiconductor field-effect transistor, i.e., a form of a transistor belonging to the family of insulated-gate field-effect transistors. Usually, this form is based on a layer stack consisting of a metallic gate electrode, a semiconductor, and the oxide dielectric in between. This represents a metal-insulator-semiconductor structure.

An insulated-gate bipolar transistor, IGBT, is a semiconductor device used in power electronics because it combines advantages of the bipolar transistor such as good forward conductivity, high reverse voltage, robustness, and advantages of a field-effect transistor such as nearly powerless driving.

The electrical power switch 310 includes a first input terminal 321, a second input terminal, 322 and an output terminal 331. The first input terminal is electrically connected 321 to the first battery 110 (via the switch 111). The second input terminal 322 is electrically connected to the second battery 120 (via the switch 121).

The output terminal 331 is electrically connectable to an electrical accessory 140 of the electric vehicle to provide the electrical accessory 140 with electrical energy to drive the electrical auxiliary unit 140.

The electrical power switch 310 is configured to electrically connect the output terminal 331 to either the first input terminal 321 or the second input terminal 322, as desired, to provide electrical power to the auxiliary electrical power unit 140 accordingly from the first battery 110 or the second battery 120.

The battery system 300 can be designed according to a redundancy corresponding to safety level C or D of the ASIL (Automotive Safety Integrity Level) standard.

The electrical power switch 310 may further comprise: a first pair 311 of electronic switches connected between the first input terminal 321 and the output terminal 331; and a second pair 312 of electronic switches connected between the second input terminal 322 and the output terminal 331.

The first pair 311 of electronic switches may comprise two series connected bidirectional HV MOSFETs or IGBTs, Q1, Q2, each blocking in the opposite direction to each other. The second pair 312 of electronic switches may comprise two series connected bidirectional HV MOSFETs or IGBTs, Q3, Q4, each blocking in the opposite direction to one another other in order to lock to each other.

A first electronic switch Q1 of the first pair 311 of electronic switches may be configured, in response to a first switching signal, to inhibit current flow in a direction from the first battery 110 to the auxiliary electrical unit 140. A second electronic switch Q2 of the first pair 311 of electronic switches may be configured, in response to a second switching signal, to block a flow of current in a direction from the auxiliary electrical unit to 140 the first battery 110.

A first electronic switch Q3 of the second pair 312 of electronic switches may be configured, in response to a third switching signal, to inhibit current flow in a direction from the second battery 120 to the electrical accessory 140. A second electronic switch Q4 of the second pair 312 of electronic switches may be configured, in response to a fourth switching signal, to inhibit current flow in a direction from the second battery 120 to the electrical accessory 140.

The electrical power switch 310 may further comprise: a second output terminal 332 electrically connectable to a second electrical accessory 140 of the electric vehicle, to allow the second electrical accessory 140 with electrical energy to drive the second electrical auxiliary unit 140. A corresponding output connector may be provided for each auxiliary unit 140 to selectively connect the corresponding auxiliary unit 140 to the first or second battery.

Auxiliary power units in this disclosure are high voltage auxiliary power units which are powered by the traction batteries 110, 120 and not by simple 12V batteries. They may be a compressor for the air conditioning system, steering assist or a heater, which, for operation, requires a high voltage, such as 400 volts.

The electrical power switch 310 may further comprise: another first pair 313 of electronic switches connected between the first input terminal 321 and the second output terminal 332; and another second pair 314 of electronic switches connected between the second input terminal 322 and the second output terminal 332.

The battery system 300 may further include a first high voltage contactor 111 connected between the first input terminal 321 of the electrical power switch 310 and a drive side terminal 116 of the first battery 110. The first high voltage contactor 111 is configured to disconnect the first input terminal 321 of the electrical power switch 310 from the drive side terminal 116 of the first battery 110 in response to a first disconnect signal.

The battery system 300 may further include a second high voltage contactor 121 connected between the second input terminal 322 of the electrical power switch 310 and a drive side terminal 126 of the second battery 120. The second high voltage contactor 121 is configured, in response to a second shutdown signal, to turn off the second input terminal 322 of the electrical energy switch 310 from the drive side terminal 126 of the second battery 120.

The first input terminal 321 of the electrical energy switch 310 may be connected to a first drive-side pole 116, in particular, a drive-side positive pole, the first battery 110 and a first drive-side terminal 126, in particular a drive-side positive terminal, of the second battery 120 be electrically connected.

The output terminal 331 of the electrical energy switch 310 may be connected 140 to a second terminal 117,127 of the first battery via the auxiliary electrical unit 110 or the second battery 120, and in particular a drive-side 117, 127 or mains-side negative terminal 128, can be electrically connected.

The battery system 300 may further include a third high voltage contactor 114 connected between a first line side terminal 119 of the first battery 110 and a charging socket 130 wherein the third high voltage contactor 114 is configured to disconnect the first line side terminal 119 of the first battery 110 from the charging receptacle in response to a third disconnect signal.

The battery system 300 may further include 124 a fourth high-voltage contactor that is connected between a second line-side terminal 128 of the second battery 120 and the charging receptacle 130, wherein the fourth high-voltage contactor 124 is configured to disconnect the second line-side terminal 128 of the second battery 120 from the charging receptacle in response to a fourth disconnect signal.

The battery system 300 may further comprise a fifth high voltage contactor 125 connected between the first line side terminal 119 of the first battery 110 and a first line side terminal 129 of the second battery 120, wherein the fifth high voltage contactor 125 is configured to, in response to a fifth disconnect signal, disconnect the first mains-side terminal 119 of the first battery 110 from the first mains-side terminal 129 of the second battery 120.

The shutdown signals described here can be generated by a control unit, e.g., a vehicle control unit or controller or a battery control unit or controller according to a logic.

The second line-side terminal 128 of the first battery 110 is electrically connected to the second line-side terminal 128 of the second battery 120.

The electrical energy switch 310 can switch the auxiliary electrical unit 140 from the first battery 110 to the second battery 120 without interruption.

Figure 4:
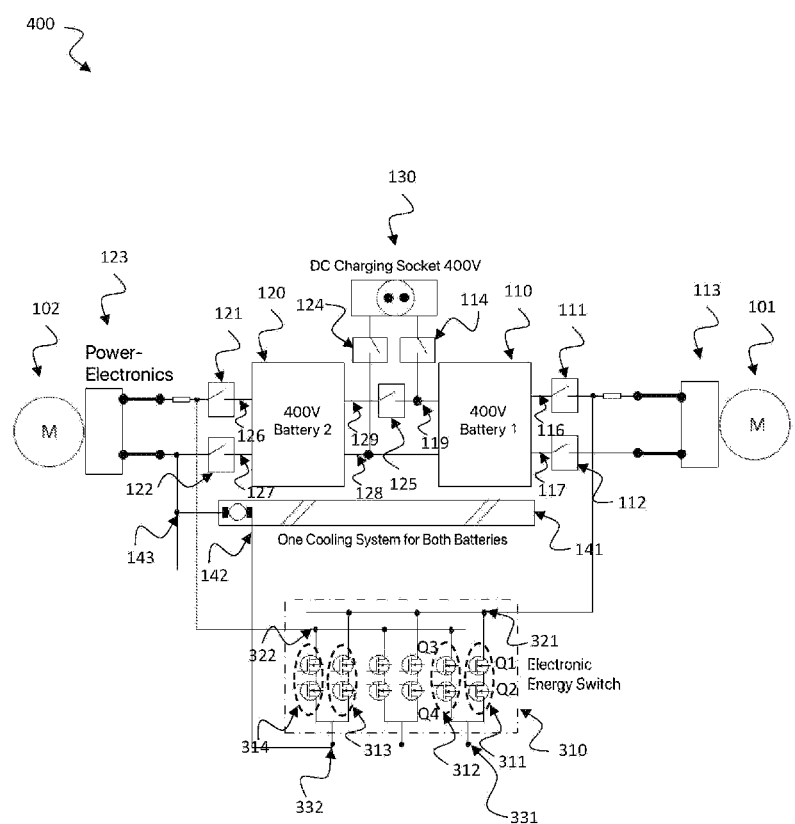
FIG. 4 depicts a schematic representation of the configuration according to the invention with HV energy switch for alternate supply of a compressor via both batteries.

FIG. 4 shows a schematic representation of the configuration according to the invention with HV energy switch 310 for the alternate supply of a compressor 141 via both batteries 110,120.

The configuration is the same as described 3 above for Figure. In FIG. 4, an exemplary auxiliary unit 140 is a compressor 141 of a refrigeration system. The input port 142 of the compressor 141 is connected in this example to the second output 332 of the electrical energy switch, and the output terminal 143 of the compressor 141 is connected 120 (via the switch 122) to the drive-side negative terminal 127 of the second battery. Alternatively, the output terminal 143 of the compressor 141 can also be connected (via the switch 112) to the drive-side negative terminal 117 of the first battery 110, or to the line-side negative terminal 128 of the first and second battery 110,120.

FIG. 4 shows how, as an example, a compressor 141 can be supplied via both batteries 110, 120. This arrangement is particularly advantageous because the air conditioning must also be active for longer periods when the vehicle is stationary and a symmetrical loading of the two batteries 110, 120 can only be carried out via such an energy switch 310.

Figure 5:
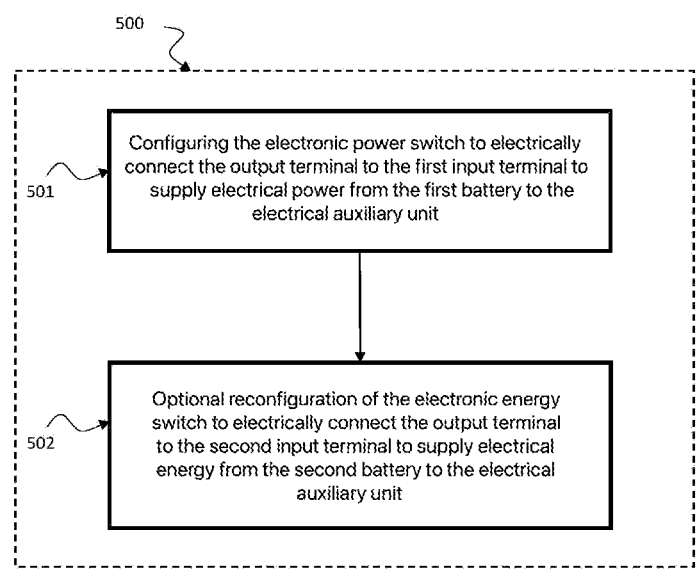
FIG. 5 depicts a schematic representation of a method according 500 to the invention for supplying power to an electrical auxiliary unit.

FIG. 5 shows a schematic representation of a method 500 according to the invention for the powering an electrical auxiliary unit.

The method 500 is for redundantly supplying electrical energy from a battery system 300, 400 to an auxiliary electrical unit 140 of an electric vehicle, the electric vehicle as described above with respect to FIGS. 3 and 4 driving the electric auxiliary power unit. The battery system 300, 400 includes the following components: a first battery 110 connectable to a first electric drive 101 to provide electrical energy to the first electric drive 101 to power the electric vehicle, as described above with respect to FIGS. 3 and 4; a second, redundant battery 120 connectable to a second, redundant electric drive 102 is connectable to provide electrical power to the second electric drive 102 to drive the electric vehicle, as described above with respect to FIGS. 3 and 4; and a configurable electrical power switch 310 having a first input port 321, a second input port 322, and an output port, 331, the first input port 321 being connected to the first battery 110 electrically connected as described above with respect to FIGS. 3 and 4. The second input terminal 322 is electrically connected to the second battery 120, and the output terminal 331 is electrically connected to the electrical accessory 140 of the electric vehicle to provide electrical power to the electrical accessory to drive the electrical accessory, as described above with respect to FIGS. 3 and 4.

The method 500 comprises the steps of: configuring 501 the electrical power switch 310 to electrically connect the output port 331 to the first input port to provide 321, the electrical accessory 140 with electrical power from the first battery 110; and selectively reconfiguring 502 the electronic power switch 310 to electrically connect the output terminal 331 to the second input terminal 322 to provide electrical power from the second battery 120 to the electrical accessory 140.

Since the embodiments and inventions described in detail above are exemplary embodiments, they can be modified to a large extent in the usual way by a person skilled in the art without leaving the field of invention. In particular, the arrangements and the proportions of the individual elements to each other are simply exemplary. Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A battery system for an electric vehicle, comprising:
a first battery configured to be connectable to a first electric drive in order to provide electric power to the first electric drive so as to drive the electric vehicle;
a second, redundant battery configured to be connectable to a second, redundant electric drive in order to provide electrical energy to the second electric drive so as to drive the electric vehicle; and
an electronic power switch comprising a first input port, a second input port, and an output port, and
wherein a first input terminal is arranged to be electrically connected to the first battery,
wherein the second input terminal is arranged to be electrically connected to the second battery, and
wherein an output terminal is arranged to be electrically connectable to connected to an electrical accessory of the electric vehicle so as to provide electrical power to the electrical accessory and to drive the electrical accessory, wherein the electronic energy switch is configured to selectively and electrically connect the output terminal to the first input terminal or the second input terminal so as to supply electrical energy from the first battery or the second battery to the electrical accessory; and wherein the electronic power switch further comprises:
a first pair of electronic switches arranged to be connected between the first input terminal and the output terminal and comprising two bidirectional HV MOSFETs or IGBTs connected in series, each blocking in opposite directions to the other;
a second pair of electronic switches arranged to be connected between the second input terminal and the output terminal and comprising two series-connected bidirectional HV MOSFETs or IGBTs, each blocking in the opposite direction to the other.

2. The battery system according to claim 1, wherein the battery system is configured for a redundancy corresponding to safety level C or D of the Automotive Safety Integrity Level standard.

3. The battery system according to claim 1, wherein a first electronic switch of the first pair of electronic switches is configured, in response to a first switching signal, to block a current flow in a direction from the first battery to the auxiliary electrical unit;
wherein a second electronic switch of the first pair of electronic switches is configured to be adapted, in response to a second switching signal, to inhibit current flow in a direction from the auxiliary electric unit to the first battery;
wherein a first electronic switch of the second pair of electronic switches is configured to be adapted, in response to a third switching signal, to inhibit current flow in a direction from the second battery to the auxiliary electrical unit; and
wherein a second electronic switch of the second pair of electronic switches is configured to be adapted, in response to a fourth switching signal, to inhibit current flow in a direction from the auxiliary electric unit to the second battery.

4. The battery system according to claim 1, wherein the electronic power switch further comprises:
a second output terminal arranged to be electrically connectable to a second electrical accessory of the electric vehicle so as to provide electrical power to the second electrical accessory and drive the second electrical accessory.

5. The battery system according to claim 4, wherein the electronic power switch further comprises:
a further first pair of electronic switches arranged to be connected between the first input terminal and the second output terminal; and
another second pair of electronic switches arranged to be connected between the second input terminal and the second output terminal.

6. The battery system according to claim 1, further comprising:
a first high-voltage contactor arranged to be connected between the first input terminal of the electronic power switch and a drive-side terminal of the first battery, the first high-voltage contactor being configured to disconnect the first input terminal of the electronic power switch from the drive-side terminal of the first battery in response to a first shutdown signal; and
a second high-voltage contactor arranged to be connected between the second input terminal of the electronic power switch and a drive-side terminal of the second battery, the second high-voltage contactor being adapted to disconnect the second input terminal of the electronic power switch from the drive-side terminal of the second battery in response to a second shutdown signal.

7. The battery system according to claim 1, wherein the first input terminal of the electronic energy switch is arranged to be electrically connected to at least one of a first drive-side terminal of the first battery, a drive-side positive terminal, of the first battery, a first drive-side terminal of the second battery, and a drive-side positive terminal, of the second battery.

8. The battery system according to claim 1, wherein the output terminal of the electronic energy switch is configured to be electrically connected to at least one of a second pole of the first battery-a second pole of the second battery, a negative pole on the drive side and a negative pole on the mains side, via the electrical auxiliary unit.

9. The battery system according to claim 1, further comprising:
a third high-voltage contactor arranged to be connected between a first line-side terminal of the first battery and a charging receptacle, the third high-voltage contactor being configured to disconnect the first line-side terminal of the first battery from the charging receptacle in response to a third disconnect signal; and
a fourth high-voltage contactor arranged to be connected between a second line-side terminal of the second battery and the charging receptacle, the fourth high-voltage contactor being configured to be adapted to disconnect the second line-side terminal of the second battery from the charging receptacle in response to a fourth shutdown signal.

10. The battery system according to claim 9, further comprising:
a fifth high voltage contactor arranged to be connected between the first line side terminal of the first battery and a first line side terminal of the second battery, and
wherein the fifth high voltage contactor is configured to disconnect the first line side terminal of the first battery from the first line side terminal of the second battery in response to a fifth disconnect signal.

11. The battery system according to claim 9, wherein the second grid-side terminal of the first battery is electrically connected to the second grid-side terminal of the second battery.

12. The battery system according to claim 1, wherein the electronic energy switch is configured to switch the electrical auxiliary unit from the first battery to the second battery without interruption.

13. A method for redundantly supplying electrical power to an auxiliary electrical unit of an electric vehicle from a battery system of the electric vehicle to power the auxiliary electrical unit, wherein the battery system comprises:
providing a first battery connectable to a first electric drive to provide electrical energy to the first electric drive for driving the electric vehicle;
providing a second, redundant battery connectable to a second, redundant electric drive to provide electrical energy to the second electric drive to drive the electric vehicle;

providing a configurable electronic power switch having a first input port, a second input port, and an output port (331);

arranging the first input terminal to be electrically connected to the first battery;

arranging the second input terminal to be electrically connected to the second battery arranging the output terminal to be electrically connected to the electrical accessory of the electric vehicle to provide electrical power to the electrical accessory to drive the electrical accessory;

configuring the electronic power switch to electrically connect the output terminal to the first input terminal so as to provide electrical power to the electric accessory from the first battery;

selectively reconfiguring the electronic power switch to electrically connect the output terminal to the second input terminal so as to provide electrical power from the second battery to the electrical accessory; and wherein the electronic power switch further comprises:
  a first pair electronic switches arranged to be connected between the first input terminal and the output terminal and comprising two bidirectional HV MOSFETs or IGBTs connected in series, each blocking in opposite directions to the other;
  a second pair of electronic switches arranged to be connected between the second input termini and the output terminal and comprising two series-connected bidirectional HV MOSFETs or IGBTs, each blocking in the opposite direction to the other.

* * * * *